E. H. FROMME.
STRAW SPREADER.
APPLICATION FILED MAR. 2, 1917.

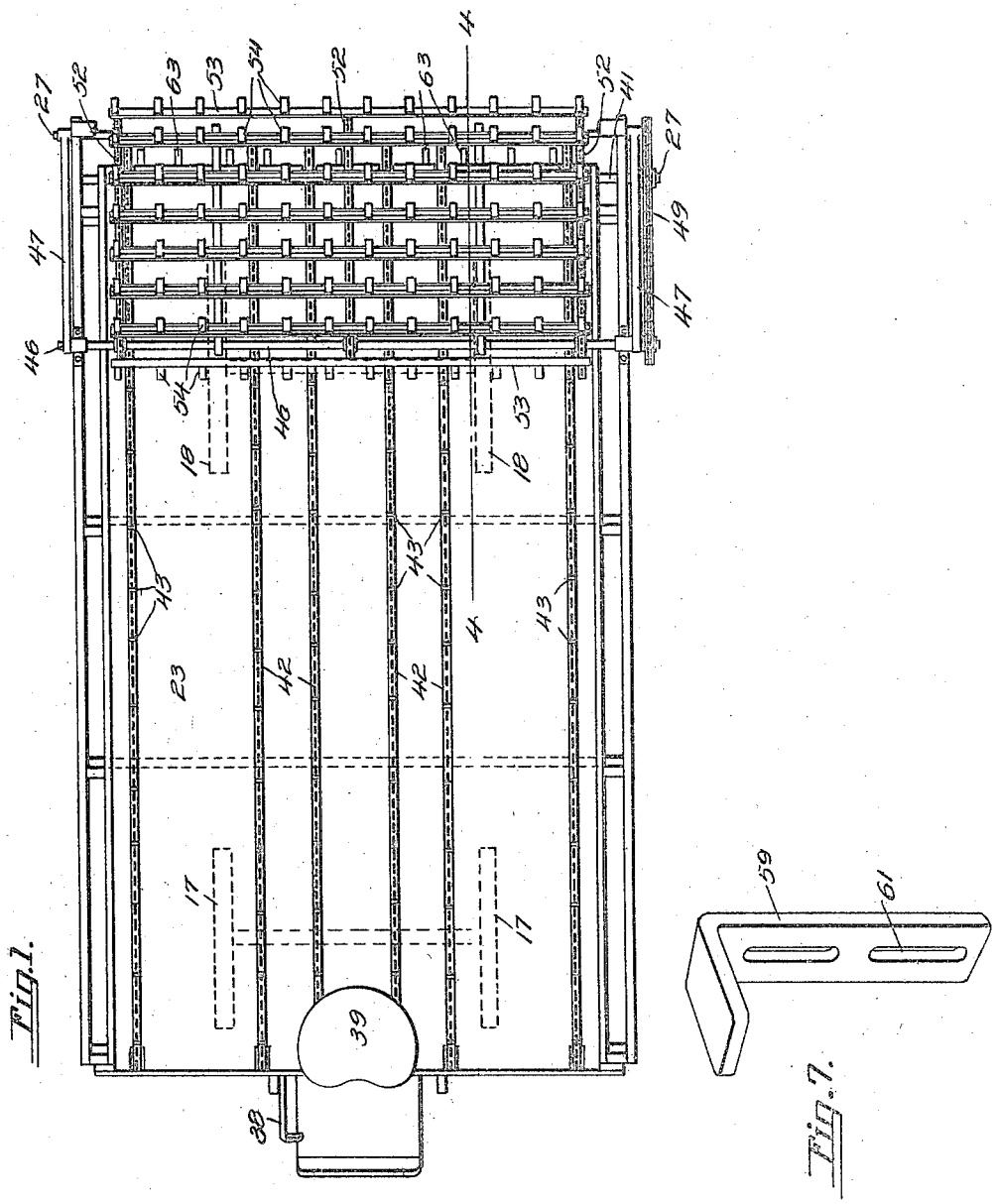

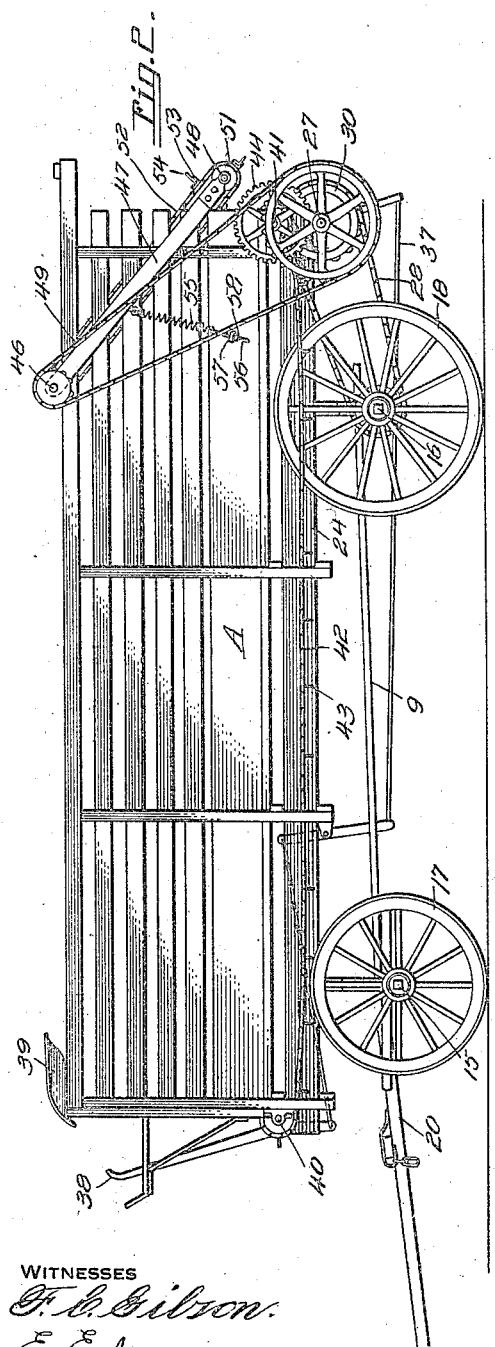
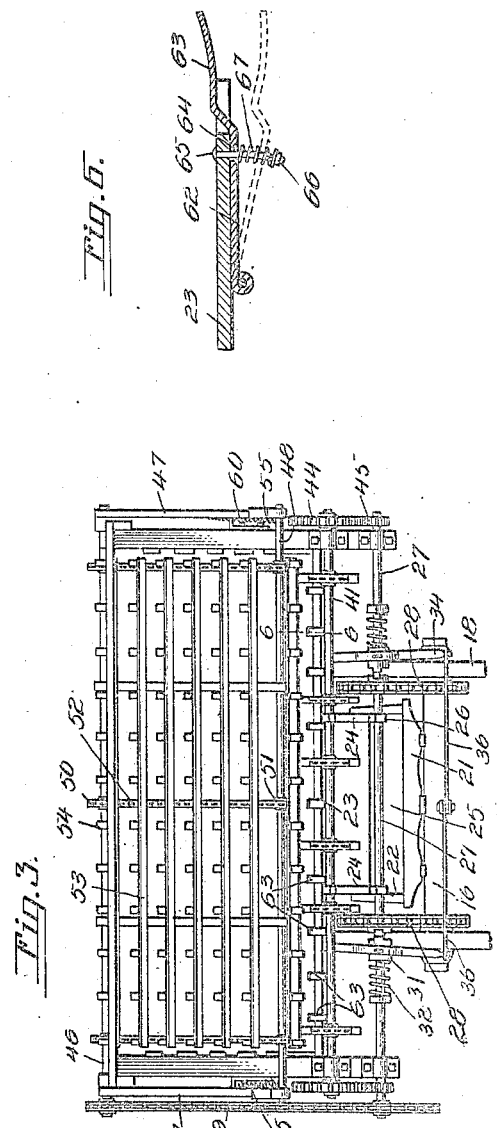

1,248,303.

Patented Nov. 27, 1917.
3 SHEETS—SHEET 3.

WITNESSES
F. C. Gibson.
E. E. Young.

INVENTOR
Edward H. Fromme.
BY Victor J. Evans
ATTORNEY

UNITED STATES PATENT OFFICE.

EDWARD H. FROMME, OF MULLINVILLE, KANSAS.

STRAW-SPREADER.

1,248,303.          Specification of Letters Patent.        Patented Nov. 27, 1917.

Application filed March 2, 1917. Serial No. 152,053.

*To all whom it may concern:*

Be it known that I, EDWARD H. FROMME, a citizen of the United States, residing at Mullinville, in the county of Kiowa and State of Kansas, have invented new and useful Improvements in Straw-Spreaders, of which the following is a specification.

This invention relates to straw spreaders which are used for spreading or scattering straw on the ground for the purpose of enriching the soil.

The invention has for its object to produce a machine of large capacity and of simple and improved construction, the same comprising a box or rack mounted on supporting wheels and equipped with mechanism whereby straw previously loaded into the box or rack may be spread or scattered on the surface of the ground as the machine moves forward, the moving parts of the straw spreading mechanism being driven by power derived from the transporting wheels.

A further object of the invention is to simplify and improve the construction and operation of the straw spreading and scattering means.

Further objects of the invention are to produce simple and effective means whereby the spreading means may be thrown in and out of operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings;

Figure 1 is a top plan view of a machine constructed in accordance with the invention.

Fig. 2 is a side elevation of the same.

Fig. 3 is a rear elevation.

Fig. 6 is a sectional detail view of one of the resilient spreading fingers taken on the line 6—6 in Fig. 3.

Fig. 7 is a perspective detail view of a stop member or bracket used in connection with the device.

Corresponding parts in the several figures of the drawings are denoted by like characters of reference.

Figure 4:
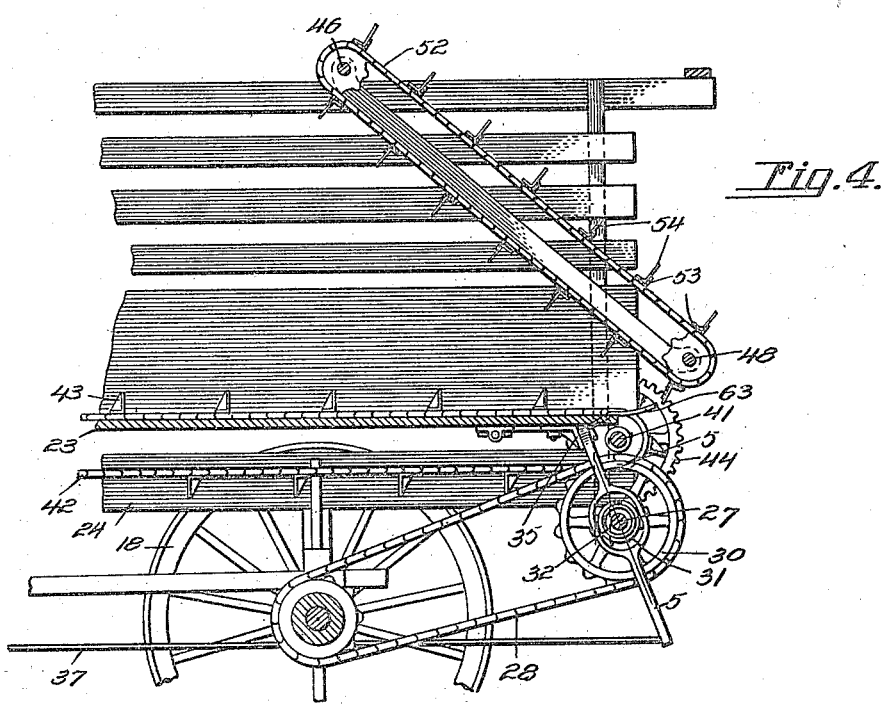
Fig. 4 is a longitudinal sectional detail view taken on the line 4—4 in Fig. 1.

The box or rack A of the improved device is supported on an ordinary wagon running gear of which 15 and 16 designate the front and rear axles, 17 and 18 the front and rear wheels, 19 the reach, 20 the tongue, 21 the bolsters and 22 the standards. The box or rack A which is made of large size so as to be capable of carrying as large a load as may be desired, has a bottom 23. Extending longitudinally beneath said bottom member are two sills 24 which are suitably spaced apart and fitted between the standards 22 of the running gear, said sills being supported on blocks 25 that are placed on the bolsters 21 for the purpose of raising or elevating the rack to a proper height above the transporting wheels. This simple construction also enables the straw spreading mechanism to be conveniently mounted upon or detached from an ordinary wagon running gear, enabling the latter to be utilized for other purposes when the straw spreader is not in use.

Figure 5:
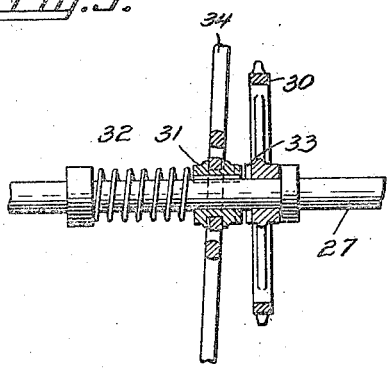
Fig. 5 is a sectional detail view of the clutch mechanism taken on the line 5—5 in Fig. 4.

On the under sides of the sills 24 near the rear ends thereof are provided boxes or bearings 26 for a shaft 27 which is regarded as the main shaft of the straw spreader. The shaft 27 receives motion through the medium of transmission chains 28 from the hind wheels 18, the latter being provided with sprocket wheels 29 and the shaft 27 being provided with sprocket wheels 30 over which the chains 28 are trained. The sprocket wheels 30 as will be best seen in Fig. 5 are free to rotate on the shaft 27 but each of said sprocket wheels may be operatively connected with the shaft for rotation therewith by means of a clutch member 31 which is keyed or splined on the shaft for rotation therewith and which is moved in the direction of the sprocket wheel 30 by means of a spring 32. It will be understood that the action of the springs 32 serves to normally hold the clutch members 31 in engagement with corresponding clutch members 33 on the sprocket wheels 30. For the purpose of disengaging the clutch members 31, shipping levers 34 are provided, each of said levers being pivoted on a bracket 35 on the under side of the bottom member 23 of the box or rack A. The shipping levers 34 are connected by links or toggles 36 with an operating rod or bar 37 which is suitably connected with and actuated by a foot lever 38 mounted in convenient proximity to the driver's seat 39 so that the driver or operator at will may throw the clutch devices out of gear. thus interrupting the rotation of the shaft 27 as well as the operation of the moving parts actuated from said shaft as will be presently described.

Supported for rotation adjacent to the front and rear ends of the bottom member 23 of the rack are shafts 40 and 41 over which are trained a plurality of conveyer chains 42 the top leads of which are supported on the top face of the bottom member 23, said chains being composed of links some of which are equipped with teeth 43 to engage the load and to move the latter in a rearward direction. The shaft 41 is driven from the shaft 27 by intermeshing gears 44 and 45, the gears 44 on the shaft 41 being relatively large and the gears 45 on the shaft 27 being relatively small so that the shaft 41 will be driven at a proper low speed.

Supported on top of the rack A is a shaft 46 on which are pivotally supported arms 47 which extend downwardly and rearwardly with respect to the rack, overhanging the bottom member thereof. The arms 47 may be regarded as constituting the side members of a spreader frame which in addition to said arms is composed of the shaft 46 and another shaft 48 which is supported for rotation in bearings at the free ends of the arms or side members 47. The shaft 46 is driven by a chain transmission 49 from the shaft 27 at a suitable high speed. The shafts 46 and 48 are provided intermediate the ends thereof with sprocket wheels 50, 51 over which are trained conveyer chains 52, said chains being connected in series by means of slats 53 having load engaging teeth 54 which when the device is in operation serve to rake the straw from the rear end of the load and to scatter it broad-cast on the ground. It will be seen that the top shaft 46 of the spreader frame is supported in such a position, a short distance forwardly of the rear end of the rack, that the load carried in the rack will be gravitatingly engaged by the spreading conveyer carried by said frame which also may be regarded as constituting an end gate to prevent part of the load from dropping on the ground while in transit. The spreading conveyer is also forced in engagement with the load by means of springs 55 having their upper ends connected with the arms or side members 47 and provided at their lower ends with eyebolts 56 guided through brackets 57 on the sides of the wagon box, said eyebolts being provided with adjusting nuts 58 whereby the springs may be tensioned. To limit the movement of the spreading conveyer in the direction of the load, stop members are provided the same consisting of brackets 59, said brackets being secured on the sides of the rack A by means of bolts 60 engaging slots 61 in the said brackets which may thus be adjusted so as to properly limit the movement of the spreader frame under the influence of the springs 55.

Pivotally supported on the under side of the bottom member 23 of the rack are a plurality of fingers 62 that extend rearwardly of the bottom member and are provided with upwardly offset and curved terminals 63. These fingers are arranged in the interspaces between the teeth 54 of the slatted spreader and each of said fingers is apertured at 64 for the passage of a guide pin 65 extending through the bottom member 23 and having at its lower end an adjusting nut 66 between which and the finger 62 is placed a coiled spring 67, the function of the springs being to press the rearward ends of the fingers normally in an upward direction. When the machine is in operation the spreading conveyer will rake the straw downwardly over the fingers 62, depressing the latter against the tension of the springs 67 and causing a vibratory motion of the fingers which is found to be highly effective in spreading and scattering the load broadcast as it is being discharged from the box or rack by the action of the spreading conveyer.

From the foregoing description, taken in connection with the drawings hereto annexed, the operation and advantages of this invention will be readily understood. The box or rack A, as will be seen, is entirely independent of the running gear from which it may be lifted when not required for present use by simply disconnecting the chains 28. When the rack is placed on the running gear in position for operation and the load has been placed therein it may be driven to the field, the spreading mechanism being meanwhile thrown out of gear by disconnecting the clutch mechanism. By simply restoring the clutch mechanism to engaging or operative condition the spreading mechanism will be set in motion and the load will be slowly carried in a rearward direction and held in engagement with the spreader by the action of the conveyer chains 42. A large load may thus be quickly scattered, the area receiving the load being regulated partly by the degree of tension exerted by the springs 55 on the spreader frame, partly by properly limiting the movement of the spreader frame in a loadward direction by means of the stop members or brackets 59, and also, to some extent, by the tension exerted by the springs 67 on the fingers 62.

Having thus described the invention, what is claimed as new is:

1. In a straw spreader, a rack having a bottom member provided with rearwardly extending pivotally and resiliently supported fingers, and a swingingly supported driven spreader conveyer having slats provided with teeth arranged in the interspaces between the resilient fingers.

2. In a straw spreader, a rack having a bottom member, fingers pivoted on the under side of the bottom member and extending rearwardly thereof, said fingers having upwardly offset terminals, springs whereby said fingers are resiliently forced in an upward direction, and a movably supported load engaging spreading device having teeth arranged in the interspaces between the resilient fingers.

3. In a straw spreader, a rack having a bottom member, resilient fingers connected with the bottom member and extending rearwardly thereof, a swingingly supported spreader conveyer having slats provided with load engaging teeth arranged in the interspaces between the resilient fingers, means for resiliently forcing the swingingly supported spreader in a loadward direction, and adjustably supported means for limiting the swinging movement of the spreader in a loadward direction.

4. In a straw spreader, a rack having a bottom member provided with rearwardly extending pivotally and resiliently supported fingers, a swingingly supported driven spreader conveyer having slats provided with teeth arranged in the interspaces between the resilient fingers, and means for feeding the contents of the rack in the direction of the spreader conveyer, said means including a plurality of independent chains guided over the bottom of the rack in the interspaces between some of the rearwardly extending fingers.

5. In a straw spreader, a rack having a bottom member provided with rearwardly extending pivotally and resiliently supported fingers, shafts supported adjacent to the front and rear ends of the bottom member, separate and independent chains trained over said shafts, the top leads of said chains being guided over the bottom member of the rack, said chains being arranged in the interspaces between some of the rearwardly extending fingers, and some of the links of each chain being provided with load engaging teeth, means for driving the chains, and a swingingly supported load engaging spreading device having teeth arranged in the interspaces between the resilient fingers.

In testimony whereof I affix my signature.

EDWARD H. FROMME.

Copies of this patent may be obtained for five cents each, by addressing the "Commissioner of Patents, Washington, D. C."